(12) United States Patent
Lewis et al.

(10) Patent No.: US 9,506,491 B1
(45) Date of Patent: Nov. 29, 2016

(54) SECURING APPARATUS AND SYSTEM

(75) Inventors: Jeffrey M. Lewis, Maynard, MA (US);
Joseph P. King, Jr., Sterling, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 62 days.

(21) Appl. No.: 13/174,047

(22) Filed: Jun. 30, 2011

(51) Int. Cl.
*F16B 31/02* (2006.01)
*G06F 1/18* (2006.01)

(52) U.S. Cl.
CPC ............. *F16B 31/027* (2013.01); *G06F 1/183* (2013.01)

(58) Field of Classification Search
CPC .................... F16B 37/027; F16B 31/027
USPC ............. 411/6–8, 396, 372.5–376, 409, 410; 312/223.2
See application file for complete search history.

(56) References Cited

U.S. PATENT DOCUMENTS

| | | | | |
|---|---|---|---|---|
| 2,503,189 A * | 4/1950 | Biba, Jr. | ................ | 464/38 |
| 2,931,265 A * | 4/1960 | De Lacy | ................ | 411/403 |
| 3,073,206 A * | 1/1963 | Rudolph | ................ | 411/410 |
| 3,885,492 A * | 5/1975 | Gutshall | ................ | 411/373 |
| 4,512,697 A * | 4/1985 | Cascini | ................ | 411/7 |
| 5,266,047 A * | 11/1993 | Black et al. | ................ | 439/364 |
| 5,795,116 A * | 8/1998 | Frank et al. | ................ | 411/6 |
| 5,859,766 A * | 1/1999 | Van Scyoc et al. | ........ | 361/752 |
| 5,920,459 A * | 7/1999 | Weber et al. | ................ | 361/752 |
| 6,082,941 A * | 7/2000 | Dupont et al. | ................ | 411/7 |
| 6,364,688 B1 * | 4/2002 | Fraley et al. | ................ | 439/362 |
| 7,710,734 B2 * | 5/2010 | Ice et al. | ................ | 361/730 |
| 7,744,321 B2 * | 6/2010 | Wells | ................ | 411/377 |
| 8,199,494 B2 * | 6/2012 | Nguyen | ................ | 361/679.58 |

* cited by examiner

*Primary Examiner* — Flemming Saether
(74) *Attorney, Agent, or Firm* — Krishnendu Gupta; Konrad Lee

(57) ABSTRACT

An apparatus that may be used to facilitate securing or mounting of an assembly. The device may be constructed of a shaft and a torque managing device, where the shaft has two ends, the first end having an engagement portion. The torque managing device is coupled to the second end of the shaft having a portion of the torque managing device enabled to rotate independently from the shaft when a predetermined force used on the torque managing device has been met.

19 Claims, 14 Drawing Sheets

US 9,506,491 B1

SECURING APPARATUS AND SYSTEM

FIELD

The disclosure is directed to an apparatus and system for mounting assemblies, generally applicable to rack mounted assemblies.

BACKGROUND

This disclosure relates to hardware mounting systems used to mount an assembly to a rack or into a chassis component. Current mounting techniques include using threaded mounting screws or latched mounting brackets. The threaded mounting screws are merely long screws which go through the assembly and may be tightened using tools. Latched mounting brackets are also mounted through the assembly and tightened using a flipping latch at the end of the mounting bracket. When using either mounting method, there is no indication of complete and proper installation of the assembly, or protection against deviations from acceptable securing tolerances caused by premature wear of mounting components. In addition, tools are often required for installation to ensure the mounting brackets or screws are used properly and torqued appropriately.

SUMMARY

Various disclosed embodiments are directed towards an apparatus for facilitating mounting of assemblies. The apparatus includes a shaft with a torque managing device attached to one end and an engageable mounting mechanism at the other end. When using the securing apparatus, the torque managing device is designed to allow independent rotation of the torque managing device from the shaft. The torque managing device rotates the shaft until a predetermined torque is met, after which further rotation of the torque managing device disengages a portion of the torque managing device from the shaft, thus causing the torque managing device to cease rotating the shaft regardless of further rotational input on the torque managing device. Further, this invention provides for the extraction of the assembly by unscrewing the torque managing device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
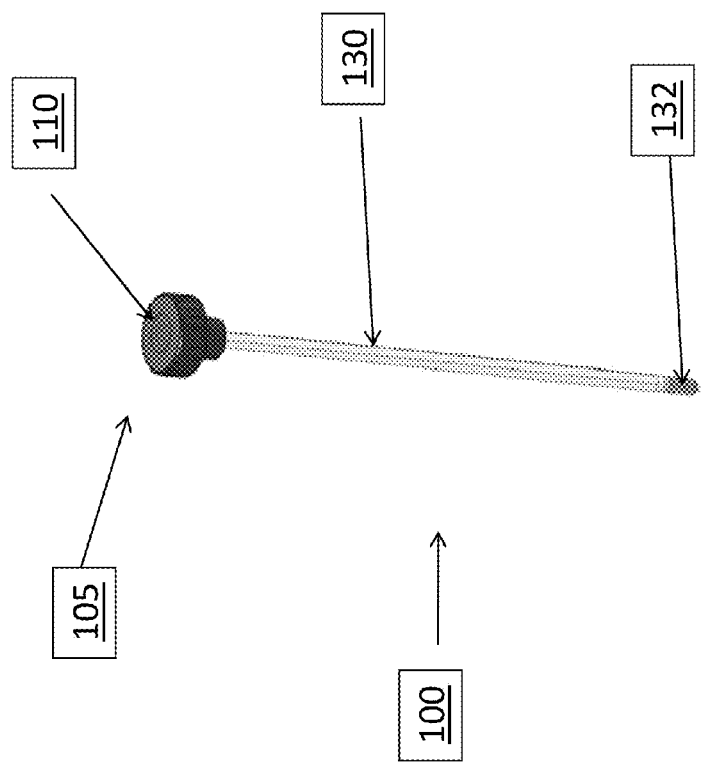
FIG. 1 illustrates a perspective view of one embodiment of the apparatus.

Referring to FIG. 1, apparatus 100 is comprised of a shaft 130 and a torque managing device 105. As shown in FIG. 1, the shaft has an engaging portion 132, in this case a threaded portion, opposite from the torque managing device 105. The torque managing device 105 also has a cover 110 inserted within. In the one embodiment, the cover 110 is enabled to be used with a hex wrench, including both manually operated or automated. In other embodiments of the invention, the cover 110 could be modified to fit a philips head, flat head, or any other tool tip known to those with ordinary skill in the art.

Figure 2:
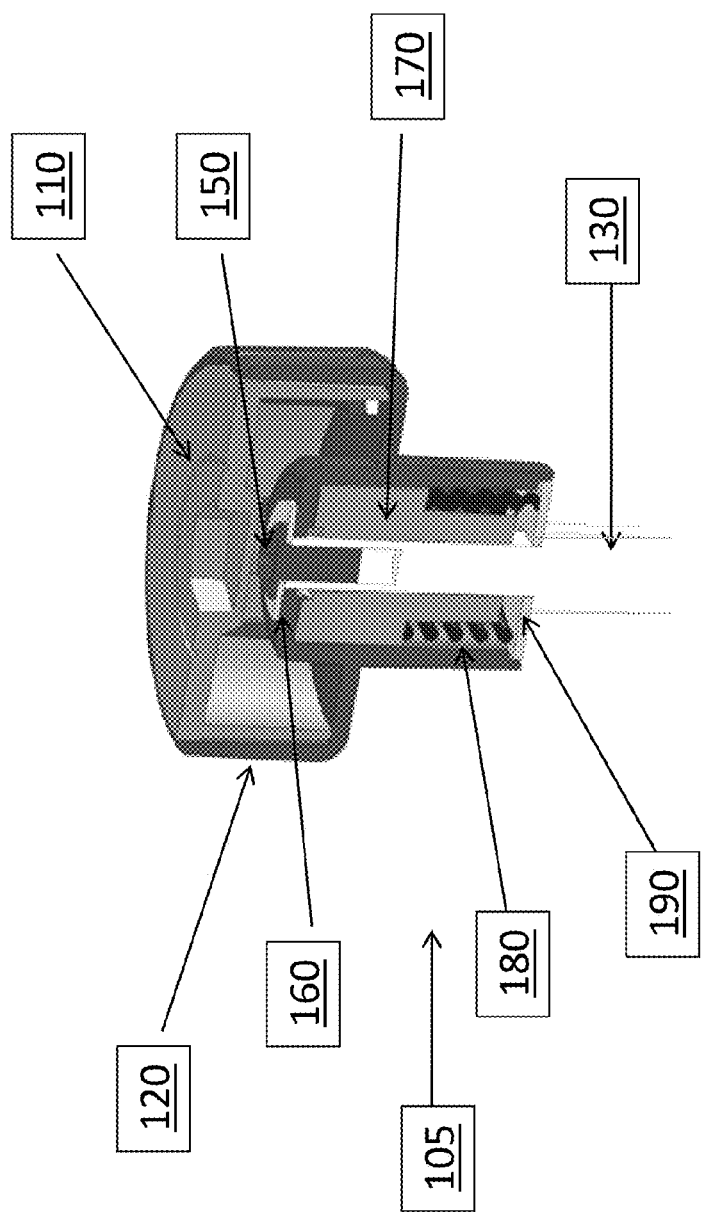
FIG. 2 illustrates a cross-sectional view of the embodiment of the apparatus shown in FIG. 1.

FIG. 2 illustrates a cross-sectional view of the torque managing device 105 shown in FIG. 1. The torque managing device 105 includes a base portion 190, force imparting device 180, which, in this embodiment, is a spring, a stator 170, and rotor 120 being mounted to the shaft 130 by a screw 150 and washer 160.

Figure 3A:
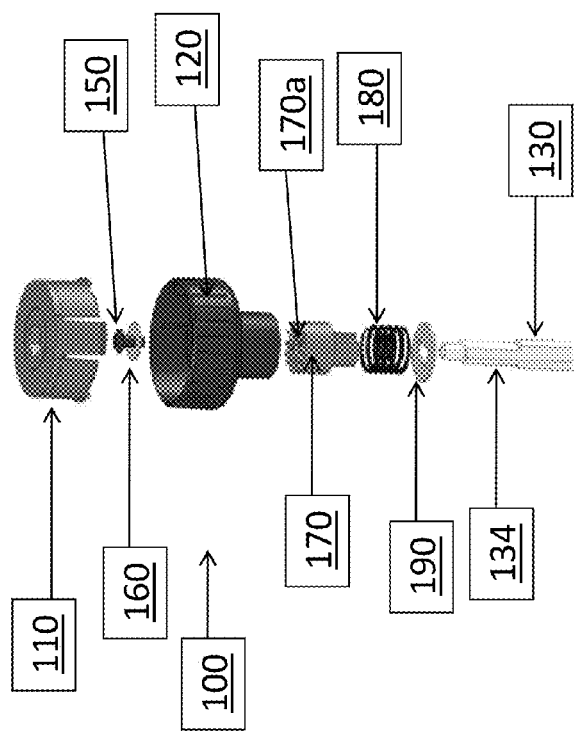
FIGS. 3A and 3B illustrate exploded views of the embodiment shown in FIG. 1.
Figure 3B:
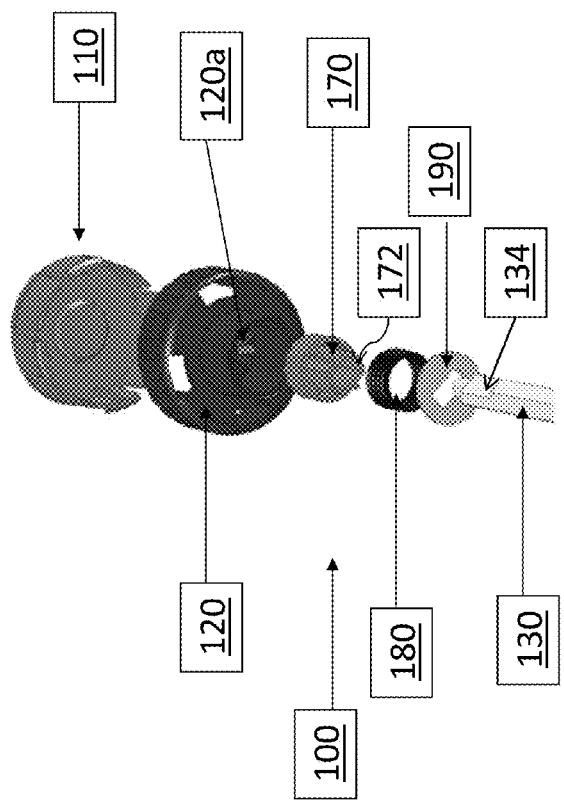

FIGS. 3A and 3B illustrate exploded views of the torque managing device 105 shown in FIG. 1. As shown in FIGS. 3A and 3B, the shaft 130 includes a portion 134 configured to receive the stator 170. Portion 134 has a shape that enables it to mate with hole 172 of the stator 170, which has a similar shape, to form a connection between the shaft 130 and the stator 170 such that the stator 170 is enabled to move along the longitudinal axis of the shaft 130, but is not allowed to rotate around the longitudinal axis of the shaft 130 in conjunction with the shaft 130. In other words, stator 170 is rotationally fixed to shaft 130 while being capable of longitudinal movement along the shaft 130. This relationship is described in greater detail below, with reference to FIGS. 3A and 3B.

Figure 4:
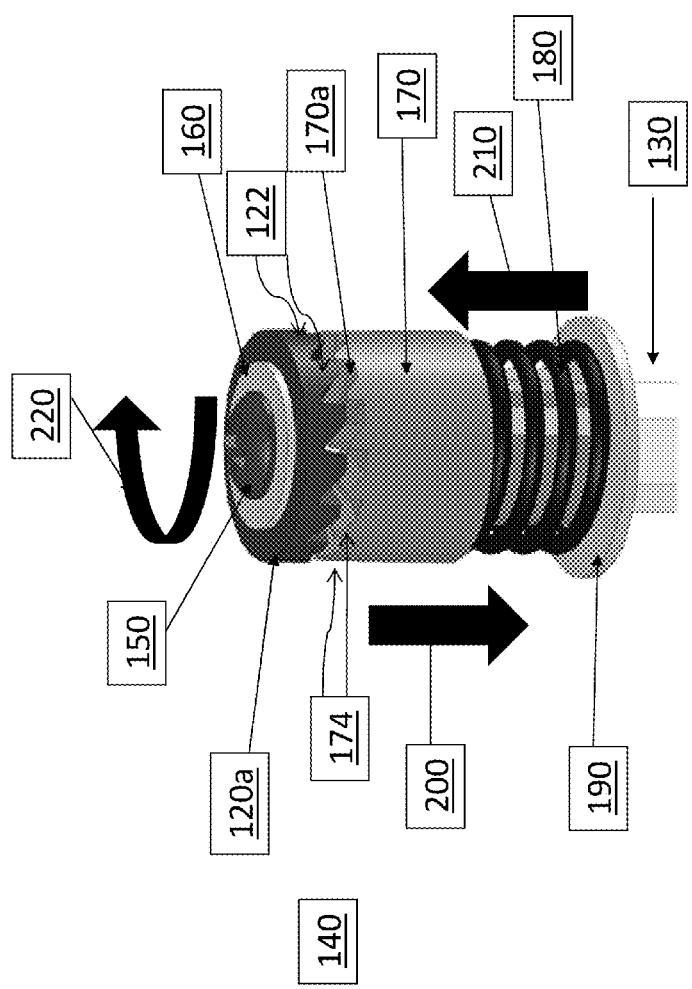
FIG. 4 illustrates a perspective view of the assembled apparatus with the grip portion of the rotor removed for clarity of the description.

As shown in both FIGS. 3A and 3B, the stator 170 includes a ramped tooth stator portion 170a and the rotor 120 also includes a ramped tooth rotor portion 120a. As shown in greater detail in FIGS. 4, 120a and 170a are configured to mesh together. While each respective portion, the ramped tooth stator portion 170a and the ramped tooth rotor portion 120a, are meshed together, creating an interface therebetween, movement by the rotor 120 can cause the entire embodiment 100 to rotate around the longitudinal axis of the shaft 130.

FIG. 4 illustrates a perspective view of the assembled torque management device 105 with the grip portion of the rotor 120 removed for clarity of the description. Note however, that the rotor 120 may be a unitary piece including the grip portion, or multiple pieces coupled together. As shown in FIG. 4, the ramped tooth rotor portion 120a has teeth 122, which results in an interface with teeth 174 of ramped tooth stator portion 170a. Since the stator 170 is fixed to the shaft with respect to movement around the longitudinal axis of the shaft 130, torsional force applied to the rotor 120, in the direction shown by arrow 220, will cause the entire apparatus 100 to rotate around the longitudinal axis of the shaft 130. Also shown in FIG. 4, the spring 180, having one end thereof fixed in place by base 190, exerts a longitudinal force on stator 120 in the direction shown by arrow 210, which forces the stator 170 to contact the rotor 120 resulting at the toothed interface. When a torsional force exerted on rotor 120 exceeds the combination of the longitudinal force exerted on the stator 170 by the spring 180 and the frictional forces between the ramped tooth rotor portion 120a and the ramped tooth stator portion 170a, the rotor 120 exerts force upon the stator 170 pushing the stator 170 in the direction shown by arrow 200, which disengages the interface. As the interface is disengaging, each tooth 122 slips over a respective tooth 174 and the stator is forced back into rotor 120, making an audible noise and a vibration felt through the rotor 120, thus providing audible and tactile feedback. In other words, each time a tooth 122 slips over a tooth 174 and the stator 170 is forced back into engagement with the rotor 120, a "click" is heard and the re-engagement is able to be felt through the grip portion of the rotor. When the ramped tooth stator portion 170a disengages from the ramped tooth rotor portion 120a, the rotor 120 rotates independently from the shaft 130 resulting in the shaft 130 remaining stationary.

Figure 5A:
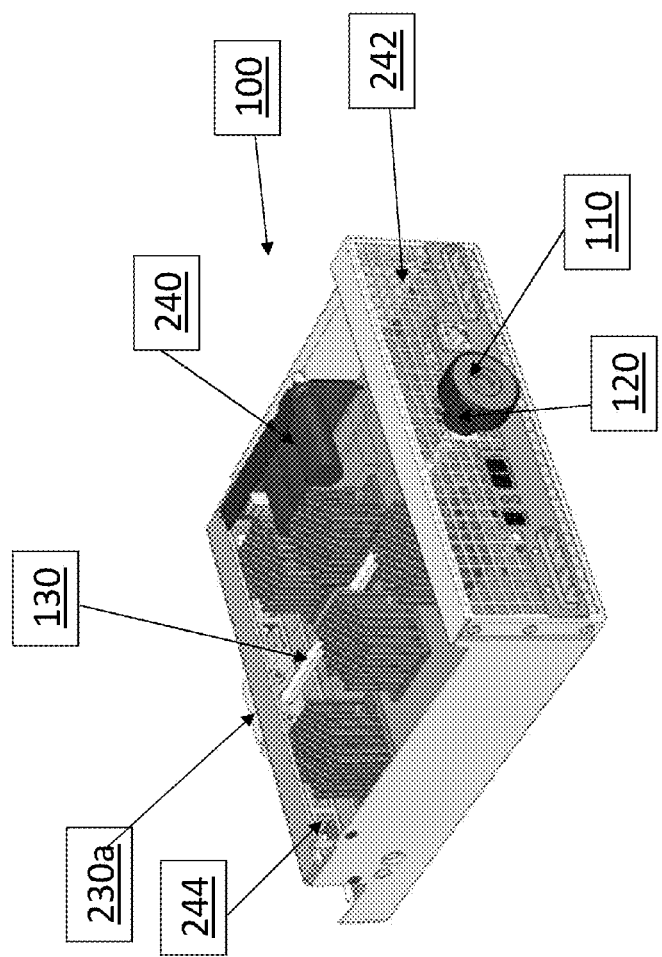
FIGS. 5A and 5B illustrate two perspectives of a system view in accordance with an embodiment of the apparatus.
Figure 5B:
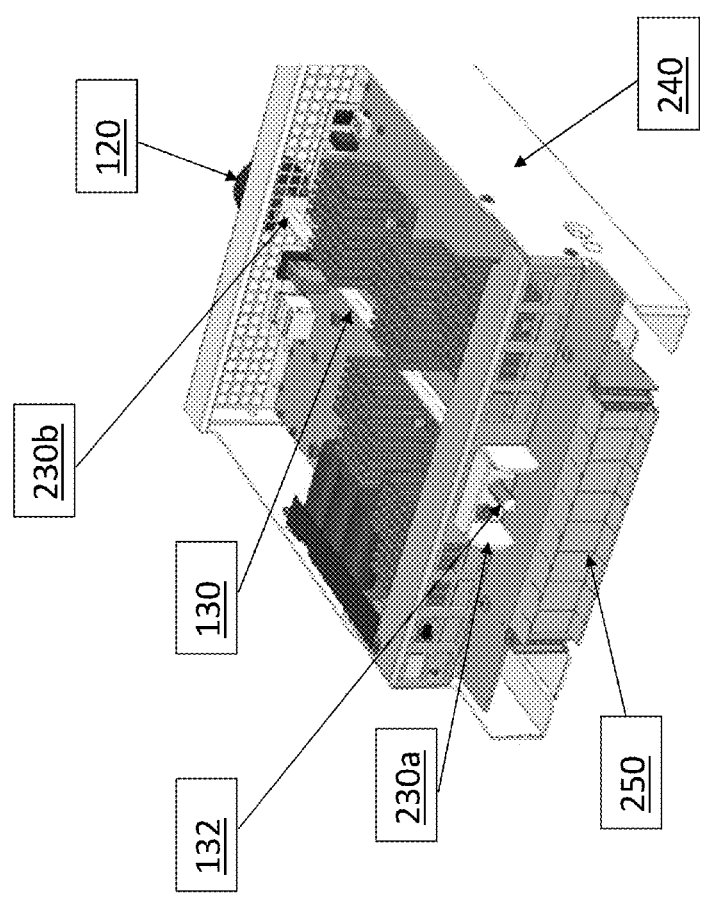

FIGS. 5A and 5B illustrate two perspectives of a system view in accordance with an embodiment of the apparatus 100. The assembly 240, which may be any type of electrical assembly mounted in a rack, such as a power supply, disk drive, etc., includes, among other features, a front wall 242 and a rear wall 244. The apparatus 100 is mounted through front wall 242 and rear wall 244 of the assembly 240, with the engaging portion 132 extending beyond the rear wall 244 of the assembly 240. Apparatus 100 is locked into place in the assembly 240 using a rear clip 230a and a forward clip 230b, which are positioned in respective circumferential slots in shaft 130 (not shown). This configuration secures apparatus 100 in place within assembly 240 while enabling shaft 130 to rotate freely. The apparatus 100 is configured to align and properly secure the electrical connectors 250 of the assembly 240 to a socket of the rack (as described below).

Figure 6A:
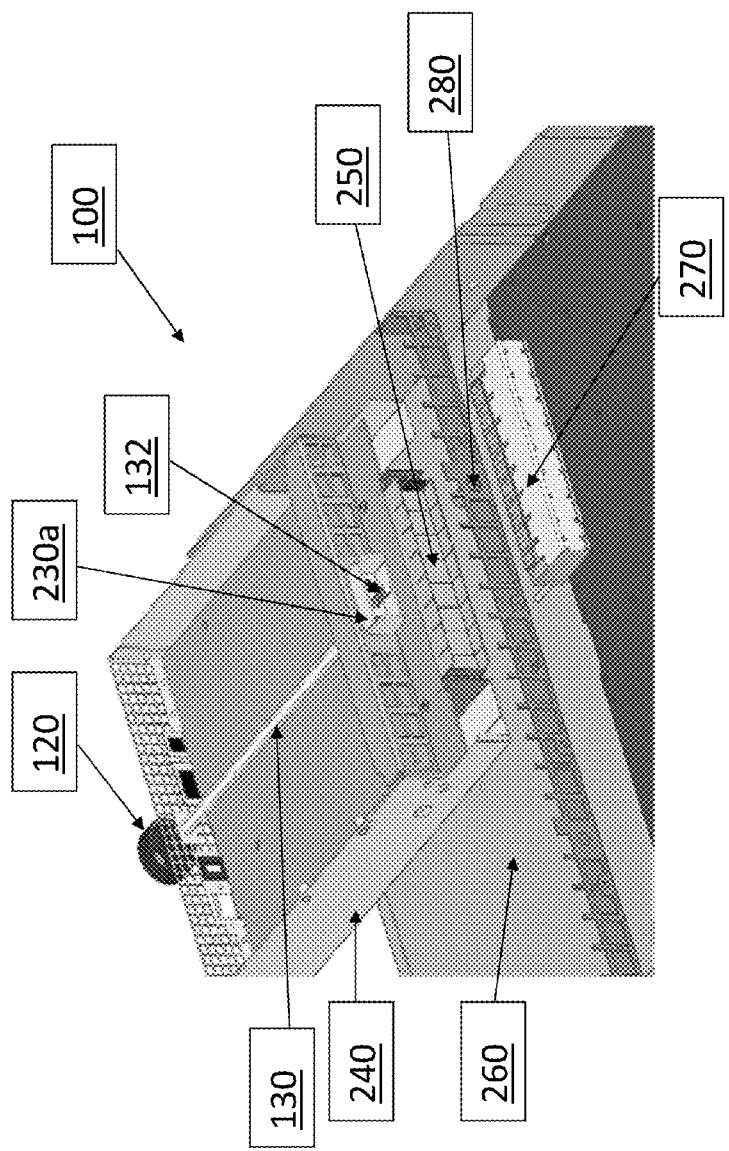
FIGS. 6A, 6B, and 6C illustrate an assembly being inserted into a rack, in accordance with an embodiment of the apparatus.
Figure 6B:
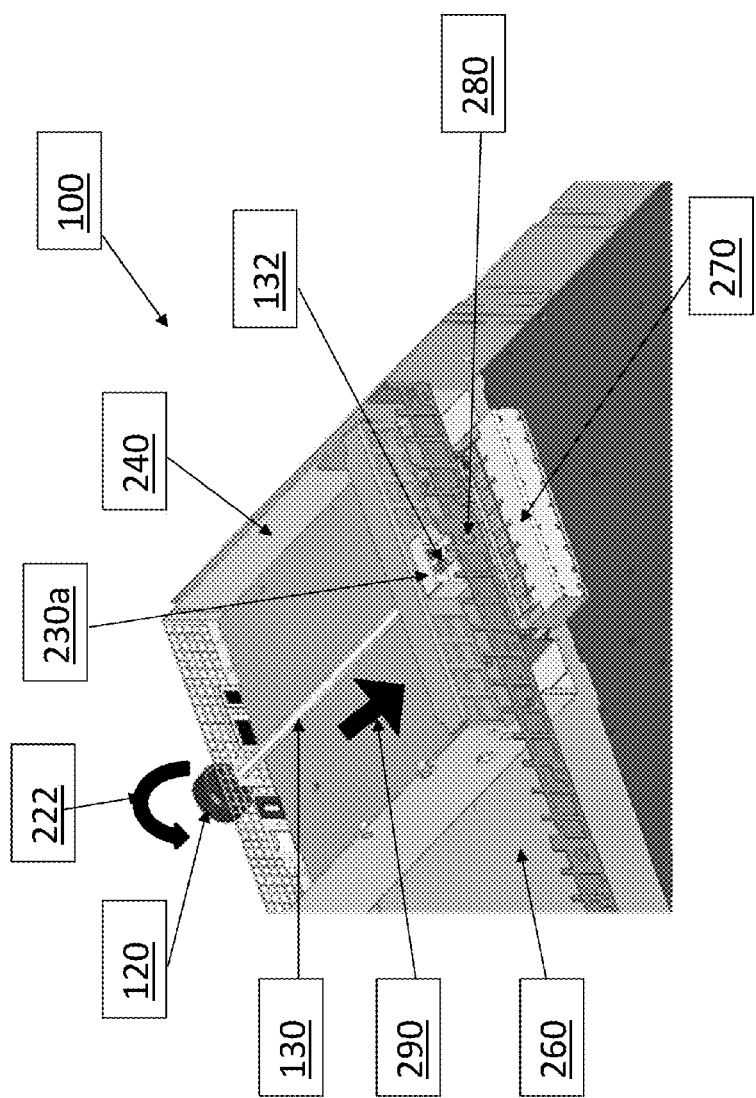
Figure 6C:
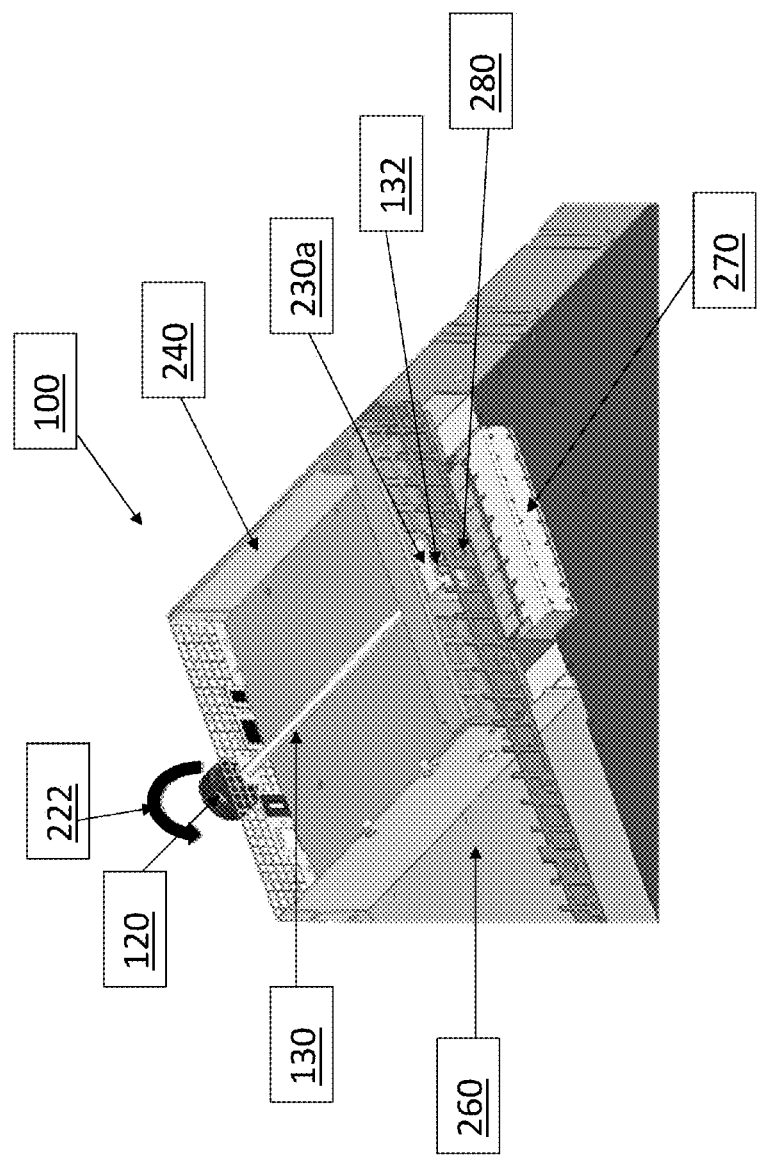

FIGS. 6A, 6B, and 6C illustrate assembly 240 being inserted into a rack 260. For simplicity in the figures, no internal components of assembly 240 are shown. As shown in FIG. 6A, the assembly 240 is being aligned with the rack 260 in preparation for connecting the assembly 240 to the rack 260. During alignment, the threaded portion 132 is aligned with the threaded receptacle 280 in the rack 260, and the electrical connectors 250 are aligned with the mated socket 270.

As shown in FIG. 6B, the assembly 240 is in position to use the embodiment 100. The threaded portion 132 of the shaft 130 is placed at threaded receptacle 280. Torsional force applied to the torque managing device 105 in the direction of arrow 222 causes the threaded portion 132 to enter the threaded receptacle 280. A mounting force slowly draws the assembly 240 into the rack 260, as shown by arrow 290. The mounting force is controlled by the apparatus 100, thereby protecting the electrical connectors 250 (FIG. 5B) and the mated socket 270 from damage.

As shown in FIG. 6C, the assembly 240 is fully mounted and the electrical connectors 250 (FIG. 5B) and the mated socket 270 are fully engaged. At this point, if the torsional force is still applied to the rotor 120, the interface between the rotor 120 and the stator 170 will begin to slip and the rotor 120 will rotate independently from the shaft 130, thus preventing over-torquing of the shaft 130, which could result in increased force between electrical connectors 250 (FIG. 5B) and socket 270, which could result in damage to the assembly 240.

Figure 7A:
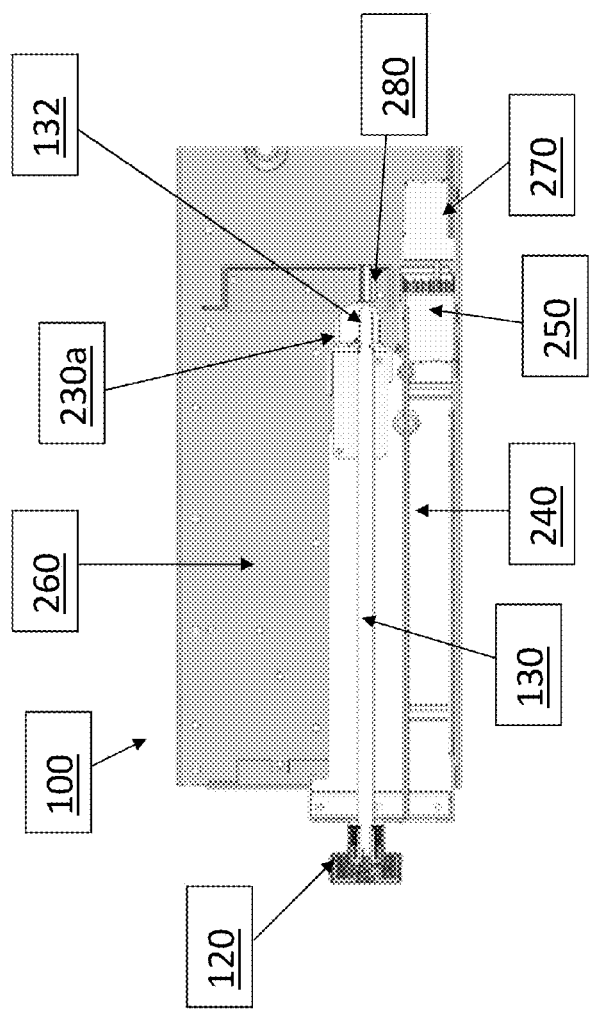
FIGS. 7A and 7B illustrate cross-sectional views of an assembly being inserted into a rack, in accordance with an embodiment of the apparatus.
Figure 7B:
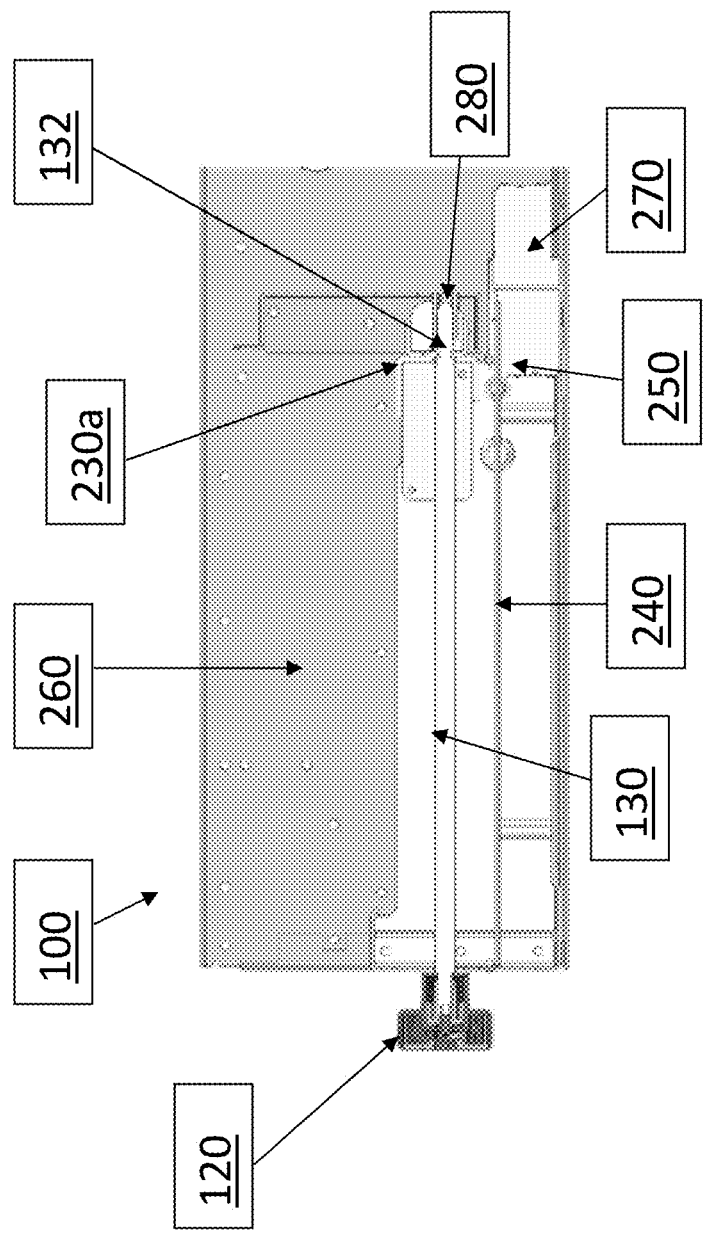

FIGS. 7A and 7B illustrate cross-sectional views of an assembly 240 being inserted into a rack 260. Similar to FIG. 6B, FIG. 7A shows an assembly 240 being aligned with a rack 260. As shown, the electrical connectors 250 are aligned with the mated socket 270 and the engaging portion 132 is aligned with the threaded receptacle 280. As shown in FIG. 7B, the electrical connectors 250 are fully engaged with the mated socket 270 and the portion 132 is fully engaged with the threaded receptacle 280.

Figure 8:
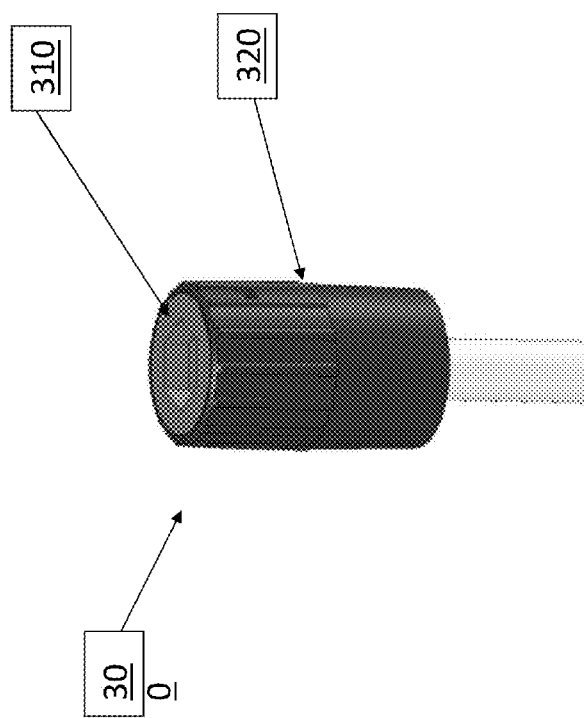
FIG. 8 illustrates an alternate embodiment of the torque management device.

FIG. 8 illustrates an alternate embodiment of the torque management device 300. As shown, the size and shape of the rotor 320 can be modified to facilitate different form factors and modify the amount of leverage a user can have. The cover 310 is modified to fit the alternate embodiment 300.

Figure 9:
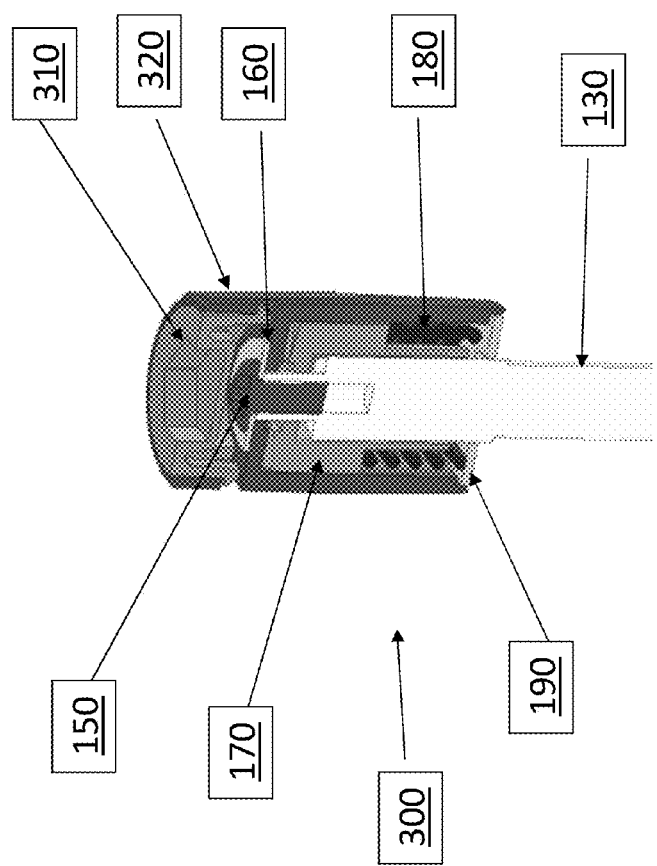
FIG. 9 illustrates a cross-sectional view of the alternate embodiment described in FIG. 8.

FIG. 9 illustrates a cross-sectional view of the alternate embodiment described in FIG. 8. As shown in FIG. 9, all of the internal parts are similar and operate in a similar manner to the previously described embodiment. The only difference being the size of the rotor 320 and the cover 310.

The apparatus offers many more advantages, including tool-less installation, use as a carry handle for the assembly, maintaining reliability of the engagement portion of the apparatus, and maintaining EMI integrity of the assembly. Reliability of the engagement portion is maintained because the assembly connectors are enabled to be engaged in a controlled manner by screwing the apparatus into the rack, thus preventing any possibility of overstressing the mating assembly connectors. The apparatus also provides a reliable and simple method of ejecting the assembly by unscrewing the apparatus. Unscrewing the apparatus uses the threads in the threaded portion of the shaft to back the assembly connectors and the assembly out from the associated socket and the rack. Additionally, EMI integrity of the assembly can be maintained because the apparatus more securely seals the perimeter of the assembly in comparison to current industry devices. The torque managing device is appropriately shaped and mounted within the assembly to provide for its use as a carry handle for the assembly and it provides audible and tactile feedback when the appropriate insertion force for the assembly has been achieved. Furthermore, the torque managing device both enables proper insertion and alignment of the assembly and full adaptive mating of the connectors between the assembly and rack or enclosure, meaning that the mated connectors are always fully seated under all tolerance conditions and are thus able to absorb all applicable mechanical tolerances within the system. This eliminates the need for additional securing mechanisms, such as complicated spring preload mechanism, which are required in conventional systems.

Additionally, the design of the current invention allows easy adjustment of the predetermined torque within the torque-managing device through a multitude of variables including, but not all inclusive, tooth angle, compression spring force, and size of the torque managing device. The current invention offers a scalable solution to securing devices that may be sensitive or fragile.

It should again be emphasized that the implementations described above are provided by way of illustration, and should not be construed as limiting the present invention to any specific embodiment or group of embodiments. For example, the invention can be implemented in other types of systems, using different arrangements of devices. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art. For example, in one embodiment, the shaft is made from metal and the torque management device made from a polymer, but any suitable materials may be used. Threaded portion 132 and threaded receptacle 280 may be replaced with any engagement configuration in which the shaft is twisted into and maintained within a receptacle, such as a post and slot configuration. These and further modifications and substitutions made by one of ordinary skill in the art are within the scope of the present invention which is not to be limited, except by the claims which follow.

What is claimed is:

1. An apparatus, comprising:
    a shaft, having a first end and a second end, wherein the first end includes an engagement portion;
    wherein the shaft includes a circumferential slot enabled to receive a retaining clip, wherein the retaining clip is enabled to hold the shaft in place while allowing the shaft to rotate;
    a torque managing device coupled to the second end of the shaft, including a first portion constructed and arranged to enable rotation around a longitudinal axis of the shaft, independently from the shaft;
    wherein the first portion is formed to enable tool-less installation using the torque managing device;
    wherein the torque managing device is coupled to the second end of the shaft using a single screw, which holds the first portion and a second portion of the torque managing device to the shaft;
    wherein the second portion of the torque managing device is configured and constructed to mesh with the first portion of the torque managing device, wherein the shaft includes a flat portion at the second end of the shaft to enable the second portion to be rotationally fixed to the shaft;
    a cover portion removeably coupled to the torque managing device, wherein the cover portion is enabled to receive a tool tip; and
    wherein the torque managing device includes at least one aperture enabled to receive a portion of the cover portion, wherein torque managing device is enabled to hold the cover portion attached to the torque managing device by retaining the portion of the cover portion within the at least one aperture.

2. The apparatus of claim 1, wherein the first portion of the torque managing device includes a rotor, and wherein the torque managing device further includes:
    a stator disposed on the second end of the shaft and constructed and arranged to (a) enable movement along the longitudinal axis of the shaft and (b) be substantially fixed to the shaft with respect to rotational movement around the longitudinal axis thereof; and
    a force imparting device imparting a force along the longitudinal axis of the shaft upon the stator, resulting in contact between the rotor and stator at an interface therebetween.

3. The apparatus of claim 2, wherein the force imparting device is a spring.

4. The apparatus of claim 2, wherein the force imparting device and the interface result in a predetermined force between the stator and rotor, wherein in a first state, the predetermined force is such that the rotor is enabled to rotate the shaft through the interface with the stator.

5. The apparatus of claim 4, wherein a rotational force is applied to the rotor which exceeds the predetermined force, causing a second state, wherein the rotor pushes the stator away, along the longitudinal axis, resulting in movement of the rotor independent of movement of the shaft.

6. The apparatus of claim 4, wherein the interface comprises a ramped tooth configuration on the rotor and the stator, enabling the stator to mesh with the rotor.

7. The apparatus of claim 1, wherein the torque managing device is enabled to be modified to augment an amount of leverage imparted by tool-less use of the apparatus.

8. A system, comprising:
    an assembly, including opposing front and rear surfaces defining a volume therebetween; wherein the front surface and rear surface each have an aperture therein; and
    an apparatus comprising:
        a shaft, having a first end and a second end, wherein the first end includes a threaded portion;
        wherein the shaft includes a circumferential slot enabled to receive a retaining clip, wherein the retaining clip is enabled to hold the shaft in place while allowing the shaft to rotate;
        a torque managing device coupled to the second end of the shaft, including a first portion constructed and arranged to enable rotation around a longitudinal axis of the shaft, independently from the shaft;
        wherein the first portion is formed to enable tool-less installation using the torque managing device;
        wherein the torque managing device is coupled to the second end of the shaft using a single screw, which holds the first portion and second portion of the torque managing device to the shaft;
        the shaft disposed within the assembly, placed through the aperture in the front surface and the aperture in the rear surface therein and spanning the volume therebetween;
        wherein the second portion of the torque managing device is configured and constructed to mesh with the first portion of the torque managing device, wherein the shaft includes a flat portion at the second end of the shaft to enable the second portion to be rotationally fixed to the shaft;
        a cover portion removeably coupled to the torque managing device, wherein the cover portion is enabled to receive a tool tip; and
        wherein the torque managing device includes at least one aperture enabled to receive a portion of the cover portion, wherein torque managing device is enabled to hold the cover portion attached to the torque managing device by retaining the portion of the cover portion within the at least one aperture.

9. The system of claim 8, wherein the first portion of the torque managing device includes a rotor, and wherein the torque managing device further includes:
    a stator disposed on the second end of the shaft and constructed and arranged to (a) enable movement along the longitudinal axis of the shaft and (b) be substantially fixed to the shaft with respect to rotational movement around the longitudinal axis thereof; and
    a force imparting device imparting a force along the longitudinal axis of the shaft upon the stator, resulting in contact between the rotor and stator at an interface therebetween.

10. The system of claim 9, wherein the force imparting device is a spring.

11. The system of claim 9, wherein the force imparting device and the interface result in a predetermined force between the stator and rotor, wherein in a first state, the predetermined force is such that the rotor is enabled to rotate the shaft through the interface with the stator.

12. The system of claim 11, wherein a rotational force is applied to the rotor which exceeds the predetermined force, causing a second state, wherein the rotor pushes the stator away, along the longitudinal axis, resulting in movement of the rotor independent of movement of the shaft.

13. The system of claim 11, wherein the interface comprises a ramped tooth configuration on the rotor and the stator, enabling the stator to mesh with the rotor.

14. A system, comprising:
   an assembly, including opposing front surface and rear surface defining a volume therebetween; wherein the front surface and rear surface have an aperture therein;
   an apparatus comprising:
      a shaft, having a first end and a second end, wherein the first end includes a threaded portion;
      wherein the shaft includes a circumferential slot enabled to receive a retaining clip, wherein the retaining clip is enabled to hold the shaft in place while allowing the shaft to rotate;
      a torque managing device coupled to the second end of the shaft, including a first portion constructed and arranged to enable rotation around a longitudinal axis of the shaft, independently from the shaft;
      wherein the first portion is formed to enable tool-less installation using the torque managing device;
      wherein the torque managing device is coupled to the second end of the shaft using a single screw, which holds the first portion and a second portion of the torque managing device to the shaft;
      wherein the second portion of the torque managing device is configured and constructed to mesh with the first portion of the torque managing device, wherein the shaft includes a flat portion at the second end of the shaft to enable the second portion to be rotationally fixed to the shaft;
      the shaft disposed within the assembly, placed through the aperture in the front surface and the aperture in the rear surface therein and spanning the volume therebetween;
      a cover portion removeably coupled to the torque managing device, wherein the cover portion is enabled to receive a tool tip; and
      wherein the torque managing device includes at least one aperture enabled to receive a portion of the cover portion, wherein torque managing device is enabled to hold the cover portion attached to the torque managing device by retaining the portion of the cover portion within the at least one aperture; and
   a rack, having an inner space configured to receive the assembly; the inner space having an receptacle, wherein at least part of the receptacle is threaded and configured to receive the engaged portion of the shaft of the apparatus.

15. The system of claim 14, wherein the first portion of the torque managing device includes a rotor, and wherein the torque managing device further includes:
   a stator disposed on the second end of the shaft and constructed and arranged to (a) enable movement along the longitudinal axis of the shaft and (b) be substantially fixed to the shaft with respect to rotational movement around the longitudinal axis thereof; and
   a force imparting device imparting a force along the longitudinal axis of the shaft upon the stator, resulting in contact between the rotor and stator at an interface therebetween.

16. The system of claim 15, wherein the force imparting device is a spring.

17. The system of claim 15, wherein the force imparting device and the interface result in a predetermined force between the stator and rotor, wherein in a first state, the predetermined force is such that the rotor is enabled to rotate the shaft through the interface with the stator.

18. The system of claim 17, wherein a rotational force is applied to the rotor which exceeds the predetermined force, causing a second state, wherein the rotor pushes the stator away, along the longitudinal axis, resulting in movement of the rotor independent of movement of the shaft.

19. The system of claim 17, wherein the interface comprises a ramped tooth configuration on the rotor and the stator, enabling the stator to mesh with the rotor.

* * * * *